W. S. SCHUYLER.
STRAINING FUNNEL.
APPLICATION FILED APR. 27, 1910.
987,261.
Patented Mar. 21, 1911.
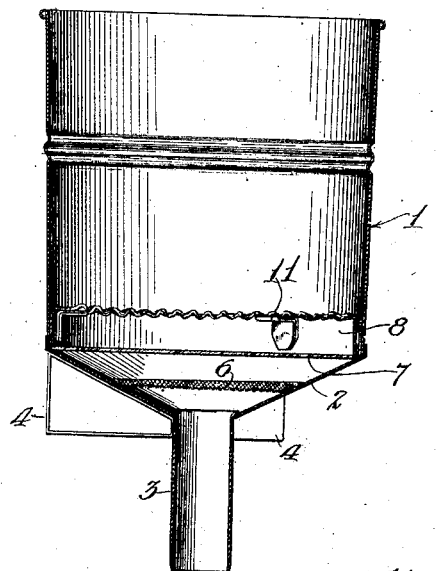
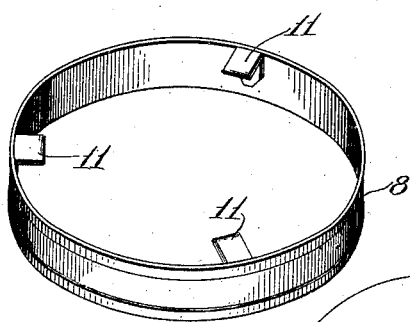
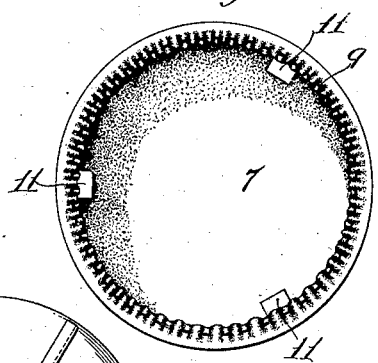
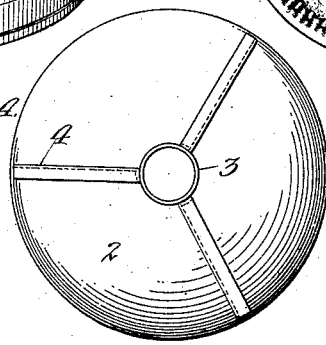
Witnesses:—
Louis W. Gratz
O. H. Shelton
Inventor:
Wilton Sumner Schuyler
by Townsend Lyon & Hackley
his attys.
THE NORRIS PETERS CO., WASHINGTON, D. C.

UNITED STATES PATENT OFFICE.

WILTON SUMNER SCHUYLER, OF SAVANNAH, MISSOURI.

STRAINING-FUNNEL.

987,261. Specification of Letters Patent. Patented Mar. 21, 1911.

Application filed April 27, 1910. Serial No. 558,066.

*To all whom it may concern:*

Be it known that I, WILTON SUMNER SCHUYLER, a citizen of the United States, residing at Savannah, in the county of Andrew and State of Missouri, have invented a new and useful Straining-Funnel, of which the following is a specification.

One object of this invention is to provide a straining funnel that can be used for straining gasolene and can also be adapted for straining water.

Another object of the invention is to provide a funnel for straining gasolene through a chamois or similar straining medium in such manner that large straining capacity will be obtained with comparatively small area of chamois or straining material.

A further object of the invention is to facilitate the insertion of a chamois strainer in the funnel and its removal therefrom.

A further object of the invention is to provide for convenient and thorough cleaning of the chamois strainer.

Another object of the invention is to provide a straining funnel which is adapted to be used in connection with receptacles having openings of different sizes.

My invention is particularly directed to obviating the objections incurred with the usual form of gasolene strainer where a chamois is drawn over the top of a funnel and the gasolene poured thereon, clamping means being used to bind the edge of the chamois around the top of the funnel more or less tightly. With such a construction the amount of gasolene which can be placed on the chamois is quite limited, the straining operation being correspondingly slow and there being a continual liability of gasolene to run or siphon over the top of the funnel causing wasteful and dangerous leakage.

The accompanying drawings illustrate the invention and referring thereto: Figure 1 is a vertical section of the straining funnel. Fig. 2 is a perspective of the frame for the strainer. Fig. 3 is a plan view of the strainer. Fig. 4 is an inverted plan.

1 designates the body of the funnel which is preferably made approximately cylindrical with a slight downward taper, this body being formed with a conical bottom 2 having a central outlet tube 3 and provided with a plurality of legs or supports 4, for example, three in number. Said legs or supports are preferably formed as wings or ribs of sheet metal extending in radial planes from the outlet 3 and extending vertically downward from the bottom cone portion 2 of the funnel to substantially the diameter of the body portion 1, the lower edges of said ribs being horizontal and adapted to rest on the top of a receptacle to support the funnel. A strainer 6 of wire gauze or similar material is secured on the bottom portion 2 of the funnel over the outlet 3 and somewhat above the upper end of said outlet portion 3 to serve as a strainer for water.

The gasolene strainer consists of a sheet or disk 7 of chamois or similar material supported on a ring 8. The chamois skin disk is stretched over a ring or circular frame 8 in the manner of a tambour and extends up around the ring and over the top thereof and is drawn tight by means of a thread or flexible tension means 9 which contracts the edge of the disk drawing it over the top of the ring 8 and holds the chamois skin firmly in position on said ring or frame. Lugs or brackets 11 may extend inwardly from the ring or frame 8 beneath the in-turned edge of the chamois skin to support the same and also to serve as handles in the manipulation of the ring. When the funnel is to be used for straining gasolene, the strainer 7 is inserted in the funnel and on account of the slight downward taper of the funnel, said strainer is wedged into the bottom of the funnel with sufficient pressure to prevent leakage of gasolene around the edges. The chamois skin which extends around the outside of the ring 8 serves as a packing means by engaging tightly with the wall of the body portion 1 of the funnel, the ring 8 supporting the chamois skin in such manner that it conforms and fits within the approximately cylindrical body portion 1 of the funnel.

When the strainer 7 has been inserted in the funnel as above described, the funnel can be used for straining gasolene, as follows: The outlet portion 3 of the funnel is placed within the mouth or opening of any suitable receptacle, the rib or wing portions 4 serving to support the funnel firmly in vertical position and allowing for considerable variation in the size of the opening of the receptacle. Gasolene is then poured into the body portion 1 of the funnel and on account of the considerable height of this body portion, considerable quantity of gasolene may be poured in at one time, this being of advantage not only in enabling the operator to proceed with the filling of the measuring can while the straining is going on, but also being of advantage in bringing to bear a greater pressure of gasolene on the straining medium 7 than is possible where the chamois skin is located at the top of the funnel. By reason of this greater pressure the gasolene flows through the chamois skin with greater velocity, thus enabling a small chamois skin to effect the same result as otherwise would require the use of a comparatively larger and more expensive chamois.

If, at any time, it is desired to clean the strainer 7, it can be quickly and readily withdrawn from the funnel and given a sharp tap against the hand or other object, so as to dislodge any sediment from the surface thereof and then replaced for further operation.

When it is desired to use the funnel for straining water, the straining member 7 may be removed, the lower strainer 6 then coming into operation.

What I claim is:

1. A straining funnel comprising an approximately cylindrical downwardly tapering body portion having a cone-shaped bottom with a central outlet portion, a wire gauze strainer supported on said cone-shaped bottom, and a strainer removably supported in the funnel above said wire gauze strainer and comprising a ring, a filtering material stretched across said ring and over the outside of the same to fit and engage within the approximately cylindrical body portion of the funnel to form a packing, and handle means on said ring.

2. A straining funnel comprising an approximately cylindrical downwardly tapering body portion having a cone-shaped bottom with a central outlet portion, a straining member detachably supported within said body portion, said straining member comprising a ring frame and a filtering material stretched across said frame and around the outside thereof, the portion of said filtering material at the outside of the frame fitting and conforming with the body portion of the funnel to form a packing, and means drawing the edge of the filtering material inwardly over the top of the ring frame to stretch the filtering material across the bottom and around the edge of the frame.

3. A straining funnel comprising an approximately cylindrical downwardly tapering body portion having a cone-shaped bottom with a central outlet portion, a straining member detachably supported within said body portion, said straining member comprising a ring frame and a filtering material stretched across said frame and around the outside thereof, the portion of said filtering material at the outside of the frame fitting and conforming with the body portion of the funnel to form a packing, means drawing the edge of the filtering material inwardly over the top of the ring frame to stretch the filtering material across the bottom of the frame, said ring frame having inwardly extending lugs extending under said inwardly drawn portions of the filtering material.

4. A straining funnel comprising a downwardly tapering body portion, a conical bottom portion, and an outlet portion at the center of the bottom portion, radial ribs extending from the cone-shaped bottom portion to support the funnel, a strainer fixed in position within the cone-shaped bottom portion, and a removable strainer extending within the body portion of the funnel and engaging with the wall thereof to form a tight joint.

5. A straining funnel provided with a conical bottom and with an outlet extending from said bottom, and a plurality of vertical ribs extending radially from said outlet means and downwardly from the conical bottom, the lower edge of said ribs being horizontal, and said ribs serving as legs for supporting the funnel.

In testimony whereof, I have hereunto set my hand at Savannah Missouri, this 15th day of April 1910.

WILTON SUMNER SCHUYLER.

In presence of—
C. H. ALLEN,
C. E. SCHUYLER.

Copies of this patent may be obtained for five cents each, by addressing the "Commissioner of Patents, Washington, D. C."